F. W. ROBERTS.
WINDSHIELD ATTACHMENT.
APPLICATION FILED JAN. 19, 1920.
1,372,552.
Patented Mar. 22, 1921.
2 SHEETS—SHEET 1.
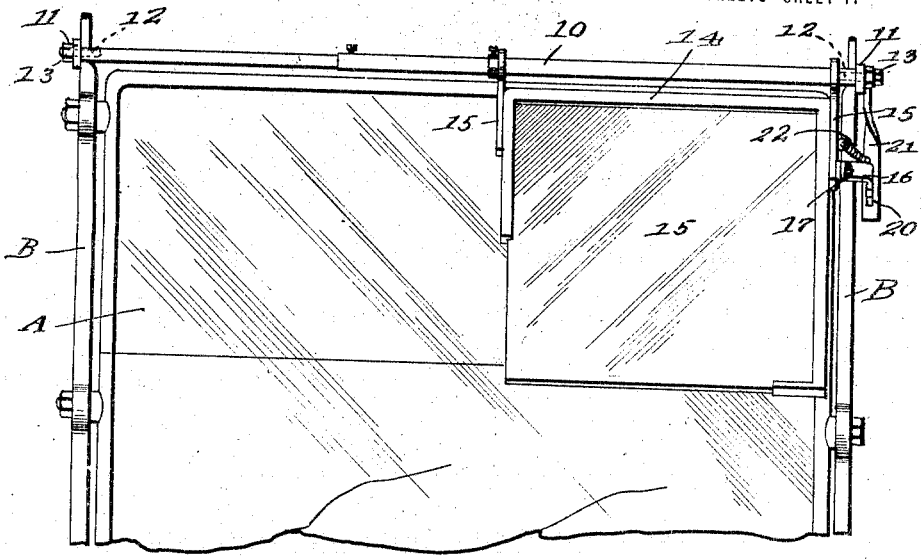
Fig. 2.
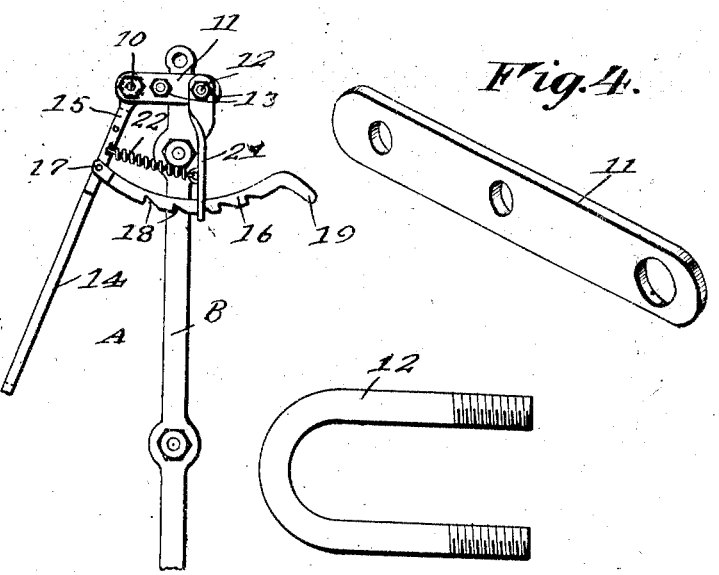
Fig. 1.
Fig. 4.
Fig. 5.
Witnesses
R. G. Thomas
Inventor
F. W. Roberts
By Victor J. Evans
Attorney F. W. ROBERTS.
WINDSHIELD ATTACHMENT.
APPLICATION FILED JAN. 19, 1920.
1,372,552.
Patented Mar. 22, 1921.
2 SHEETS—SHEET 2.
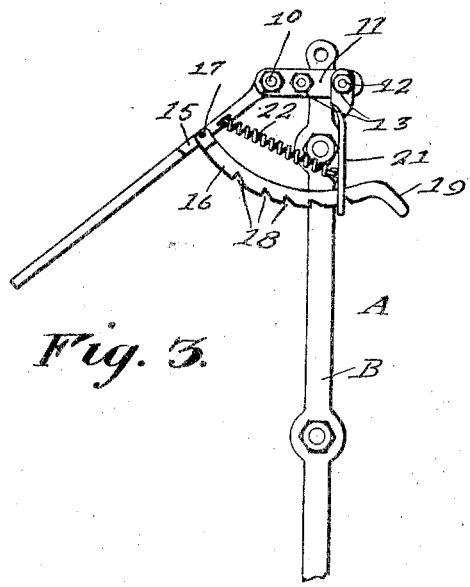
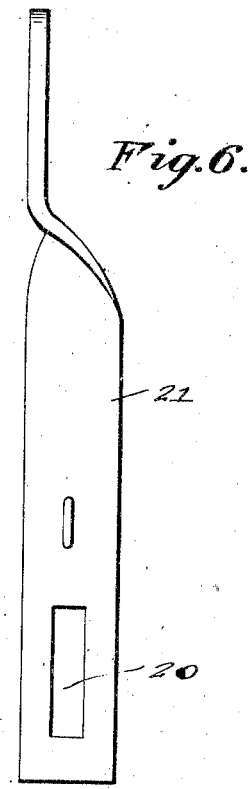
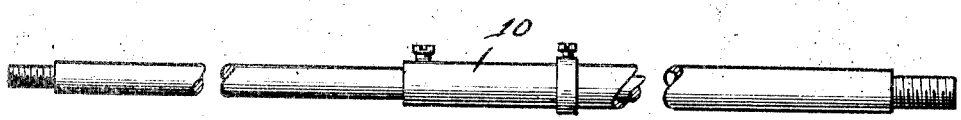
Witnesses
N. G. Thomas
Inventor
F. W. Roberts
By Victor J. Evans
Attorney

UNITED STATES PATENT OFFICE.

FRANK WAYNE ROBERTS, OF CALDWELL, IDAHO, ASSIGNOR TO DUAL AUTO VISOR SHIELD COMPANY, INC., OF DETROIT, MICHIGAN, A CORPORATION OF DELAWARE.

WINDSHIELD ATTACHMENT.

1,372,552.

Specification of Letters Patent. Patented Mar. 22, 1921.

Application filed January 19, 1920. Serial No. 352,371.

*To all whom it may concern:*

Be it known that I, FRANK W. ROBERTS, a citizen of the United States, residing at Caldwell, in the county of Canyon and State of Idaho, have invented new and useful Improvements in Windshield Attachments, of which the following is a specification.

This invention relates to attachments for the wind shields of motor vehicles and has for its object the provision of a device in the nature of a frame carrying amber, blue, smoked, or other colored glass, the frame being adjustable whereby to extend forwardly in an inclined direction in advance of the wind shield to prevent rain and snow from falling onto the wind shield, and the frame being moreover adjustable to lie substantially against the front of the wind shield so as to eliminate the glare of the sun on snow or on white roads, and also the glare of the headlights of other cars.

An important object is the provision of a device of this character provided with means whereby it may be readily clamped upon the wind shield and provided with other means whereby the position may be very quickly and easily changed.

An additional object is the provision of a device of this character which will be simple and inexpensive in manufacture and installation, highly efficient in use, durable in service, and a general improvement in the art.

With the above and other objects and advantages in view, the invention consists in the details of construction to be hereinafter more fully described and claimed, and illustrated in the accompanying drawings in which, Figure 1 is a side elevation of my device in position upon a wind shield.

Fig. 2 is a front elevation,

Fig. 3 is a side elevation on a larger scale showing the device in one position, Fig. 4 is a perspective view of the bracket member, and Fig. 5 is a perspective view of one of the U-shaped securing bolts.

Referring more particularly to the drawings, the letter A designates a wind shield of ordinary construction including the usual side bars B. In carrying out my invention I provide a telescopically adjustable rod 10 formed of tubular and solid sections slidably connected and this member extends transversely across the wind shield A at the desired height. This member is secured to the wind shield by means of clamps including strips 11 through which the ends of the member 10 extend and U-shaped bolts 12 encircling the bars B, passing through the strips 11 and provided with clamping nuts 13.

Suspended from the member 10 is a frame 14 which carries at its ends the strips 15' revoluble upon the member 10. Held within the frame 14 is a pane 15 of glass which may be of any suitable color such as amber or blue or which may be so-called smoked.

In order that the position of the frame carrying the pane may be adjusted, I provide a segment 16 which is pivotally connected with one side of the frame 14, as shown at 17, which is provided with a plurality of notches 18, and which is provided at its extremity with a handle 19. This segment is movable through a slot 20 formed in a guide member 21 secured upon the adjacent wind shield bar B and it will be readily apparent that the angularity of the frame 14 and pane 15 with respect to the wind shield may be readily varied by engaging selected ones of the notches with the lower end of the slot 20 in the guide 21. I further make use of the coil spring 22 which is secured at one end to the frame 14 and at its other end to the wind shield and the normal tendency of this spring is to bring the frame 14 and pane 15 toward the wind shield.

In the use of the device it will be seen that when my device is so disposed as to extend forwardly beyond the wind shield it will serve to prevent rain and snow from getting onto the wind shield. When the device is so adjusted as to lie close to the wind shield it will be apparent that it will serve to eliminate the glare of sun light on white roads or snow and the lights on other cars or any other lights at night and thus add greatly to the comfort of the operator by protecting his eyes.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A wind shield attachment comprising a pair of forwardly extending plates clamped upon the upper ends of the sides of a wind shield frame, a downwardly extending strip secured to one of said plates and formed with an opening, a telescopically adjustable rod connected with said plates and disposed above the top of the wind shield, a frame carrying a glass pane, arms carried by said rod and secured to said frame, a secondary arm pivoted upon said frame and extending through said opening, the lower edge of said arm being formed with notches engageable with the lower edge of the opening, the rear end of the arm being formed with a downwardly inclined portion constituting a handle, and a spring connected with said depending strip and with said frame.

In testimony whereof I affix my signature.

FRANK WAYNE ROBERTS.